(12) United States Patent
Morin

(10) Patent No.: US 9,411,053 B2
(45) Date of Patent: Aug. 9, 2016

(54) METHOD FOR USING PARTIALLY OCCLUDED IMAGES FOR NAVIGATION AND POSITIONING

(71) Applicant: NovAtel Inc., Calgary (CA)

(72) Inventor: Kristian Morin, Calgary (CA)

(73) Assignee: NovAtel Inc., Calgary (CA)

( * ) Notice: Subject to any disclaimer, the term of this patent is extended or adjusted under 35 U.S.C. 154(b) by 61 days.

(21) Appl. No.: 14/309,526

(22) Filed: Jun. 19, 2014

(65) Prior Publication Data
US 2015/0369923 A1    Dec. 24, 2015

(51) Int. Cl.
| | |
|---|---|
| *G01S 19/49* | (2010.01) |
| *G01S 19/48* | (2010.01) |
| *G01C 21/16* | (2006.01) |
| *G01C 23/00* | (2006.01) |
| *G01C 21/28* | (2006.01) |

(52) U.S. Cl.
CPC .............. *G01S 19/49* (2013.01); *G01C 21/165* (2013.01); *G01C 21/28* (2013.01); *G01C 23/00* (2013.01); *G01S 19/48* (2013.01)

(58) Field of Classification Search
CPC ..................... G01S 19/38–19/40; G01S 19/42; G01S 19/428; G01S 19/45; G01S 19/47–19/49; G01C 21/165; G01C 23/00; G01C 21/00; G01C 21/005; G01C 21/10; G01C 21/16–21/18; G01C 21/26; G01C 21/28; G01C 11/00–11/02; G01C 11/04–11/06; G01C 11/28
USPC .......................... 701/408, 468–469, 472–473, 701/478.5–480, 500–501, 505–506, 701/509–510, 514, 518, 534–536; 340/995.24–995.25, 995.28
See application file for complete search history.

(56) References Cited

U.S. PATENT DOCUMENTS

| | | | | |
|---|---|---|---|---|
| 8,457,891 | B1 * | 6/2013 | Vallot | G01C 21/165 701/501 |
| 8,996,311 | B1 * | 3/2015 | Morin | G01C 21/165 342/357.3 |
| 2006/0146136 | A1 * | 7/2006 | Cho | G01C 21/165 348/207.1 |
| 2006/0293854 | A1 * | 12/2006 | Chiou | G01S 7/40 701/301 |
| 2009/0248304 | A1 * | 10/2009 | Roumeliotis | G01C 21/16 701/500 |
| 2009/0326816 | A1 * | 12/2009 | Park | G01C 21/165 701/501 |
| 2011/0218733 | A1 * | 9/2011 | Hamza | G01C 21/165 701/469 |
| 2012/0078510 | A1 | 3/2012 | Ma et al. | |
| 2013/0131981 | A1 * | 5/2013 | Hawkinson | G06K 9/0063 701/468 |
| 2014/0267686 | A1 * | 9/2014 | Morin | G01S 19/49 348/113 |
| 2014/0375493 | A1 * | 12/2014 | Weisenburger | G01S 19/48 342/357.3 |
| 2015/0051758 | A1 * | 2/2015 | Cho | G01S 1/00 701/16 |

OTHER PUBLICATIONS

Hinsken, et al. "Triangulation of LH Systems' ADS40 Imagery Using Orima GPS/IMU," Int'l Archives of Photogrammetry and Remote Sensing, 2001 (7 Pages).

(Continued)

*Primary Examiner* — Bao Long T Nguyen
(74) *Attorney, Agent, or Firm* — Cesari and McKenna, LLP

(57) ABSTRACT

A system and method for augmenting a GNSS/INS system by using a vision system is provided. The GNSS system generates GNSS location information and the INS system generates inertial location information. The vision system further generates vision system location information that is used as an input to an error correction module. The error correction module outputs inertial location adjustment information that is used to update the inertial system's location information.

6 Claims, 4 Drawing Sheets

(56) References Cited

OTHER PUBLICATIONS

Hinsken, et al., "Triangulation of LH Systems' ADS40 Imagery Using Orima GPS/IMU", Inernational Archives of Photogrammetry Remote Sensing and Spatial Information Sciences 34.3/A, Sep. 13, 2002, pp. 156-162, XP055225973.

Mourikis, et al., "A Multi-State Constraint Kalman Filter for Vision-aided Inertial Navigation", 2007 IEEE International Conference on Robotics and Automation—Apr. 10-14, 2007, Roma, Italy, IEEE, Piscataway, NJ, USA, Apr. 10, 2007, pp. 3565-3572, XP031389349.

Vu, et al., "Real-Time Computer Vision/DGPS-Aided Inertial Navigation System for Lane-Level Vehicle Navigation", IEEE Transactions on Intelligent Transportation Systems, IEEE, Piscataway, NJ, USA, vol. 13, No. 2, Jun. 1, 2012, pp. 899-913, XP011445715.

"Extended European Search Report" European Filing Date: Jun. 16, 2015, European Filing No. 15172299.8, Applicant: Novatel Inc., Date of Mailing: Nov. 13, 2015, pp. 1-10.

* cited by examiner

METHOD FOR USING PARTIALLY OCCLUDED IMAGES FOR NAVIGATION AND POSITIONING

BACKGROUND OF THE INVENTION

1. Field of the Invention

The present invention relates generally to vision augmentation for GNSS/INS receivers and more particularly to vision augmentation using partially occluded images for GNSS/INS receivers.

2. Background Information

Vehicle may utilize some form of satellite navigation system, such as a GNSS system. The GNSS system may be paired with an inertial navigation system (INS) for improved accuracy. The combined GNSS/INS system provides current location and navigation information that may be utilized by the driver for accurate navigation. The INS system may aid in navigation when the GNSS system loses accuracy which may occur when, for example multipath situations occur. A multipath situation occurs when, e.g., signals transmitted from the GNSS satellites are reflected by local terrain and/or buildings, thereby resulting in a plurality of signals being received by the GNSS receiver. Due to the plurality of signals being received, each of which may be phase shifted and/or time delayed, the GNSS receiver may not be able to accurately detect its location.

The INS system may be utilized to improve accuracy of navigation information in multipath situations. Further, a vision system may be implemented to obtain additional location information to be used to improve INS solutions as to current location and velocity. However, when analyzing a sequence of images that are being used for navigation by the vision system, if one image becomes occluded or otherwise cannot be used to identify sufficient tie points, the solution for the entire sequence of image may become mathematically unstable. This may result in navigation updates not being able to be provided to the INS system. Generally, for every image pair there are six unknowns that need to be resolved, thereby requiring six image observations (i.e., tie points) within the image. In an exemplary sequence of 10 images, this results in 54 unknowns. To solve for such a system, every image must track six tie points. However, it should be noted that acquired images may be occluded for any of a plurality of reasons. For example, if a vision system is located on an automobile, a large truck may pass in front of the vehicle, thereby preventing the vision system from obtaining the required tie points in a plurality of sequentially acquired images. Similarly, mountains or other geographic features may result in the inability to obtain the required observations. In such situations, the vision system loses the ability to provide updates to the INS system. As such, the INS system may lose some degree of accuracy with a concomitant loss of accuracy overall navigation system when combined with the GNSS navigation information.

SUMMARY OF THE INVENTION

The disadvantages of the prior art are overcome by providing a novel GNSS/inertial navigation system (INS) that is augmented by a vision system configured to provide updates using partially occluded images to provide accurate navigation and location information for a vehicle. The GNSS system generates GNSS location information, while the INS system generates inertial system location information. The vision system identifies vision system location information that may comprise one or more tie points in acquired images from an image acquisition device. The vision system location information is fed into an error correction module that utilizes the vision system location information and inertial system location information to generate inertial system adjustment information. By utilizing the inertial system location in addition to the vision system location, image having less than the required number of tie points may be utilized in solving for the linear error correction between the photo observations and the inertial system. The inertial system adjustment information is then utilized by the INS system to update the INS system's inertial location information to enable the INS system to provide more accurate information.

BRIEF DESCRIPTION OF THE DRAWINGS

The above and further advantages of the present invention are explained in relation to the following figures in which like reference numerals indicate similar functional or structural components, of which.

DETAILED DESCRIPTION OF AN ILLUSTRATIVE EMBODIMENT

Figure 1:
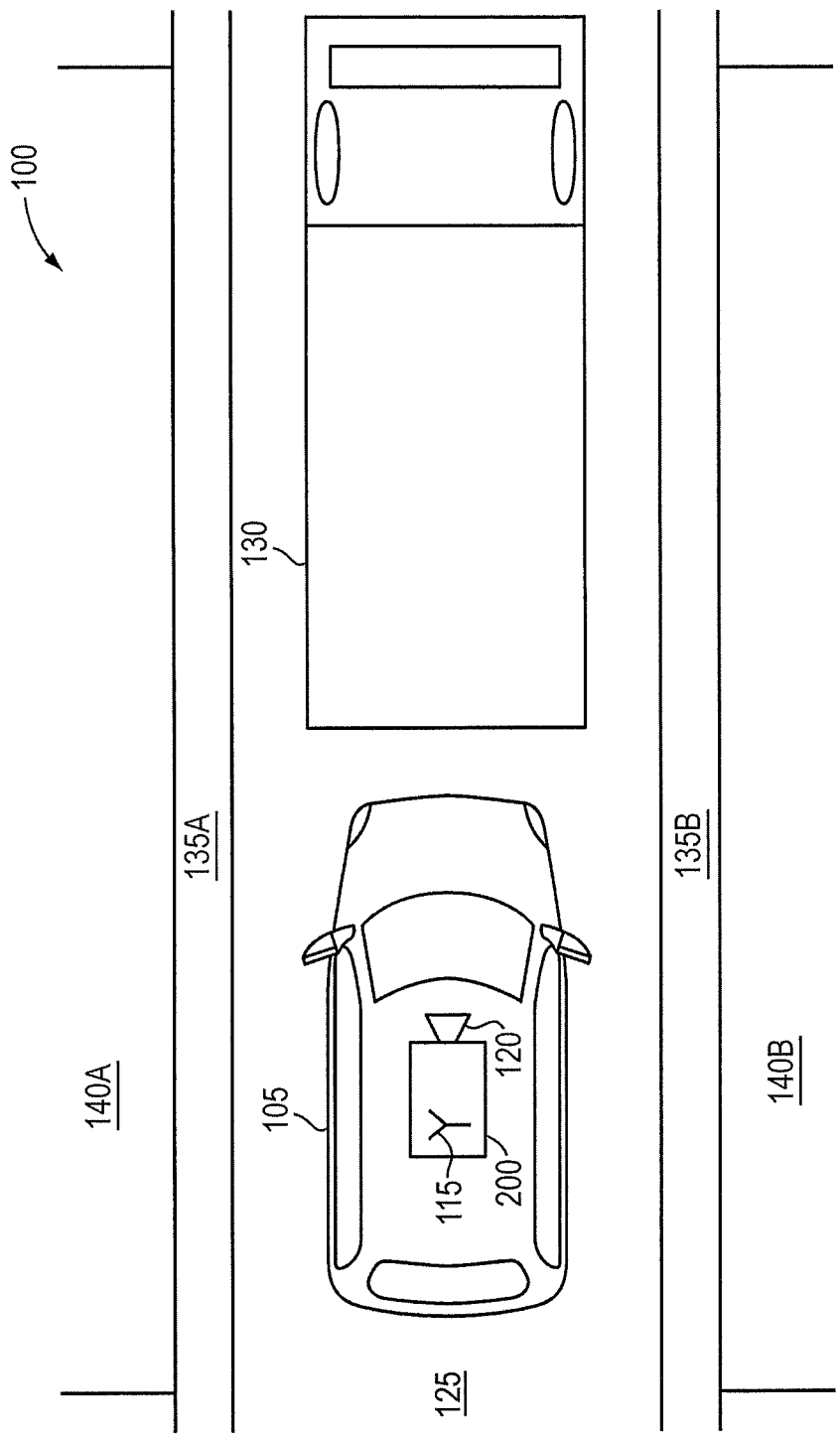
FIG. 1 is an overhead view of an exemplary navigation environment in which the principles of the present invention may be utilized in accordance with an illustrative embodiment of the present invention.

FIG. 1 is an overhead view of an exemplary navigation environment 100 in which the principles of the present invention may be utilized in accordance with an illustrative embodiment of the present invention. A vehicle 105 is illustratively located on a roadway 125. Vehicle 105 illustratively includes a GNSS/INS navigation system 200, described further below in reference to FIG. 2, an antenna 115 that may be utilized for the GNSS system, and one or more image acquisition devices 120, such as video cameras. It should be noted that in exemplary environment 100, a single image acquisition device 120 is shown. However, in alternative embodiments, additional and/or differing numbers of image acquisition devices 120 may be utilized. As such, the description of a single image acquisition device 120 should be taken as exemplary only. On the sides of roadway 120 are sidewalks 135A, B. Buildings 140 A, B may be located beyond the sidewalks 135.

In exemplary environment 100, a large truck 130 is situated immediately in front of vehicle 105. For the purpose of an example described herein, assume that vehicle 105 is utilizing a GNSS/INS navigation system 200 in conjunction with images acquired by the image acquisition device 120. Having a large truck 130 may cause significant problems in conventional systems as images may be occluded by the presence of the truck within the field of view of the image acquisition device.

Generally, an image is partially occluded if portions of the image are obstructed in a way that the vision system cannot identify needed observations (i.e., tie points) in the acquired image. A conventional vision system would not be able to resolve information to update the INS information if there are partially occluded images. However, the principles of the present invention may be utilized to provide accurate navigation information by using partially occluded figures obtained by the image acquisition device. It should be noted that the use of a large truck 130 is exemplary. The principles of the present invention may be utilized in any environment in which partially included images are acquired. As such, the description of truck 130 causing partially occluded images should be taken as exemplary only.

Figure 2:
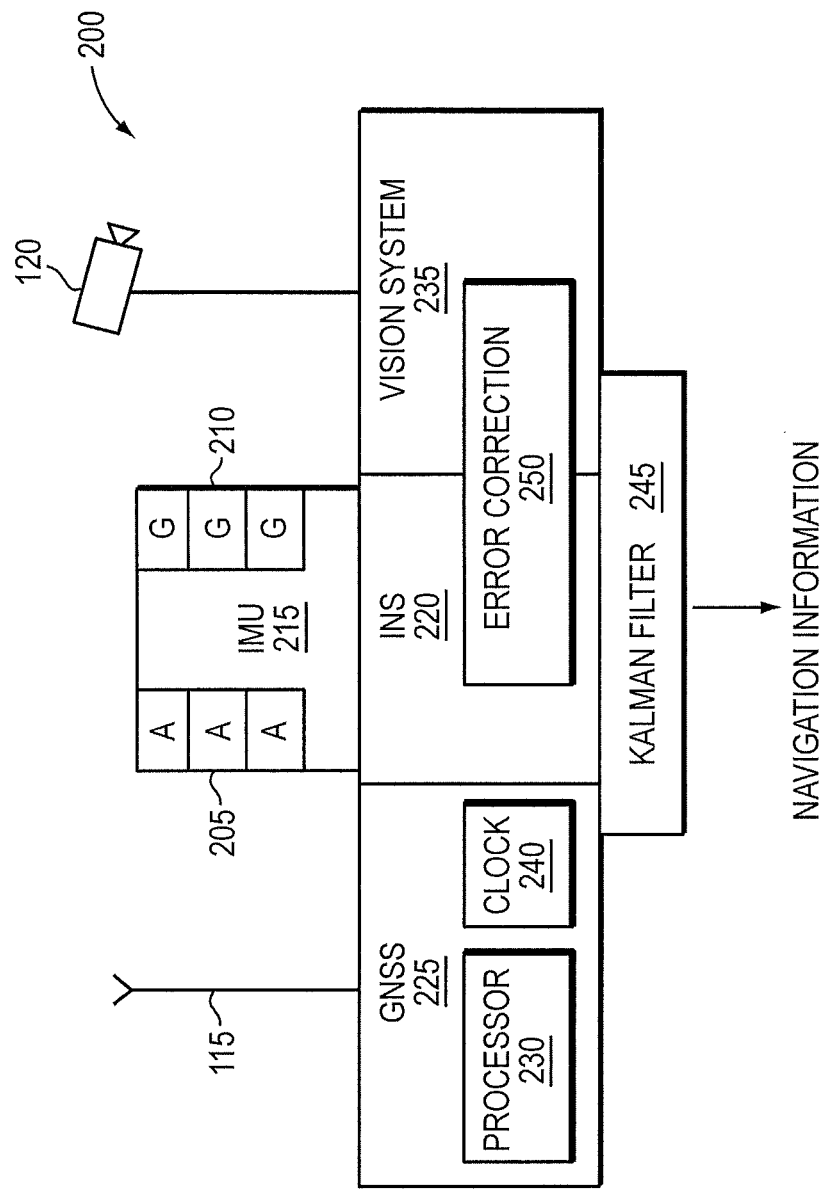
FIG. 2 is a schematic block diagram of an exemplary GNSS/INS and vision system navigation system in accordance with an illustrative embodiment of the present invention.

FIG. 2 is a schematic block diagram of an exemplary navigation system, illustratively embodied as a GNSS/INS system 200 and vision system 235 in accordance with an illustrative embodiment of the present invention. The GNSS/INS system 200 includes an INS sub-system 220 and a GNSS sub-system 225 that operate under the control of a processor 230, to calculate GNSS position and INS position, velocity and attitude information. The GNSS subsystem processes the satellite signals received over the antenna 115. The INS system receives measurements from an inertial measuring unit ("IMU") 215 that reads data from orthogonally positioned accelerometers 205 and gyroscopes 210. The data from the IMU is time tagged by the GNSS clock 235. The GNSS and INS systems can thus reliably interchange position-related information that is synchronized in time. The two systems operate together, through software integration in the processor 230, to provide position-related information between the systems.

For ease of understanding, the description of the processing operations of the two systems are made without specific reference to the processor 230. The system may instead include dedicated GNSS and INS sub-processors that communicate with one another at appropriate times to exchange information that is required to perform the various GNSS and INS calculation operations discussed below. For example, the INS sub-processor communicates with the GNSS processor when IMU data is provided to the sub-processor, in order to time-tag the data with GNSS time. Further, the GNSS sub-processor communicates with the INS sub-processor to provide GNSS position information at the start of each measurement interval, and so forth.

At start-up, the GNSS system 225 operates in a known manner to acquire the signals from at least a minimum number of GNSS satellites and calculate pseudoranges to the respective satellites and associated Doppler rates. Based on the pseudoranges, the GNSS system determines its position relative to the satellites. The GNSS system may also determine its position relative to a fixed-position base receiver (not shown), either through the use of differential correction measurements generated at the base station or after resolving associated carrier cycle ambiguities.

At the same time, the INS system 220 processes the IMU data, that is, the measurements from the various accelerometers 205 and gyroscopes 210, to determine the initial attitude and velocity of the receiver. The INS system further processes both the IMU data and the GNSS position and associated covariance information to set up various matrices for a Kalman filter 245. At the start of each measurement interval, the INS subsystem updates the Kalman filter and provides updated error states to a mechanization process. The mechanization process uses the updated information and the IMU data to propagate, over the measurement interval, the inertial position, attitude and velocity, with the inertial position and other system element errors being controlled with GNSS positions at the start of the measurement interval.

The IMU 215 plugs into a port (not shown) of the processor 230 and through the port supplies accelerometer and gyroscope measurement data to the processor. The IMU may be selected from a number of models and/or types, each associated with a different scaling factor and nominal accelerometer and gyroscope bias levels. The user may select a particular IMU model for navigation operations based on price and/or on the particular characteristics of the IMU.

At start-up, the INS system must thus determine which IMU is connected to the processor 230, in order to ensure that the IMU measurements are scaled correctly, and also to assign initial uncertainties to the attitude calculations. The INS system tests for a particular IMU by determining the scale factor associated with the accelerator measurements. The process thus compares a ratio of the magnitude of the normal gravity vector and the length of the scaled acceleration vector with stored ratios associated with the various IMU scale factors and selects the appropriate model/type.

A generic Kalman filter 245 processes estimates a series of parameters that describe and predict the behavior of a system. The Kalman filter 245 operates with a set of state variables that describe errors in the system and an associated variance covariance matrix that describes the current knowledge level of the state. The Kalman filter 245 maintains an optimal estimate of the system errors and associated covariance over time and in the presence of external measurements through the use of propagation and updating processes.

To propagate the state and its covariance from some past time to the current time, the Kalman filter propagation uses knowledge of the state dynamic behavior determined from the physics of the system and the stochastic characteristics of the system over time. Kalman filter updates thus uses the linear relationship between the state and observation vectors in conjunction with the covariance matrices related to those vectors to determine corrections to both the state vector and the state covariance matrix.

As noted above, the description contained herein comprises an exemplary embodiment of a GNSS/INS system. It is expressly noted that the principles of the present invention may be utilized with any system capable of providing real time location and navigation information. As such, the description contained herein should be taken as exemplary only.

An image acquisition device, such as camera 120, obtains one or more images of a fixed field of view. Illustratively, the camera 120 obtains a plurality of images of its fixed field of view every second. The images are conveyed to a vision system 235 that executes software (not shown) for calculating navigation and location information described further below. Illustratively, the vision system 235 is operatively connected to the clock 240 so that acquired images may be time stamped to a common clock that is also utilized for the GNSS and INS measurements. This enables the vision system 235 to provide location and navigation information at a particular point in time that is synchronized with the GNSS/INS system. In one illustrative embodiment, the clock 240 operates as a master clock to which the GNNS, INS and vision systems are slaves.

In operation, the INS system 220 generates inertial location information, the GNSS system 225 generates GNSS location information and the vision system 235 generates vision system location information. All three sets of location information are fed into the Kalman filter 245. As will be appreciated by those skilled in the art, the Kalman filter 245 weights various inputs to generate a set of output location information.

In an illustrative embodiment of the present invention, the inertial location information and the vision system location information are input into an error correction module 245. The error correction module may comprise a separate module, or may be integrated into either the vision system 235 or INS system 220. As such, the depiction of the error correction module 250 being a separate module should be taken as exemplary only.

The error correction module implements an error correction technique to model linear shift and drift between the inertial location information and the vision system location information. One exemplary error correction model is described in Triangulation of LH Systems'ADS40 Imagery Using Orima GPS/IMU, by L. Hinsken, et al, the contents of which are hereby incorporated by reference. In accordance with an illustrative embodiment of the present invention, the camera points to the horizon, instead of being used in airborne imagery as described in Hisken. The exemplary error correction module is configured to be utilized as an aid to real-time navigation of a vehicle in motion.

The error correction model assumes that the error between the inertial information and the vision system location information is linear. This assumption is true on the order of several seconds. By utilizing the error correction model, there is no minimum number of tie points required per image as long as a total of 12 tie points are viewed within a given sequence of images. The error correction module generates an inertial location adjustment information that is fed into the INS system to update the inertial location information. In this way, the error correction module 250 may enable to the vision system to provide information to the INS system when images are partially occluded. In accordance with alternative embodiments, the error correction module 250 may be configured to utilize additional sensors (not shown), such as wheel sensors to provide additional information to the error model. This enables improved error correction.

Figure 3:
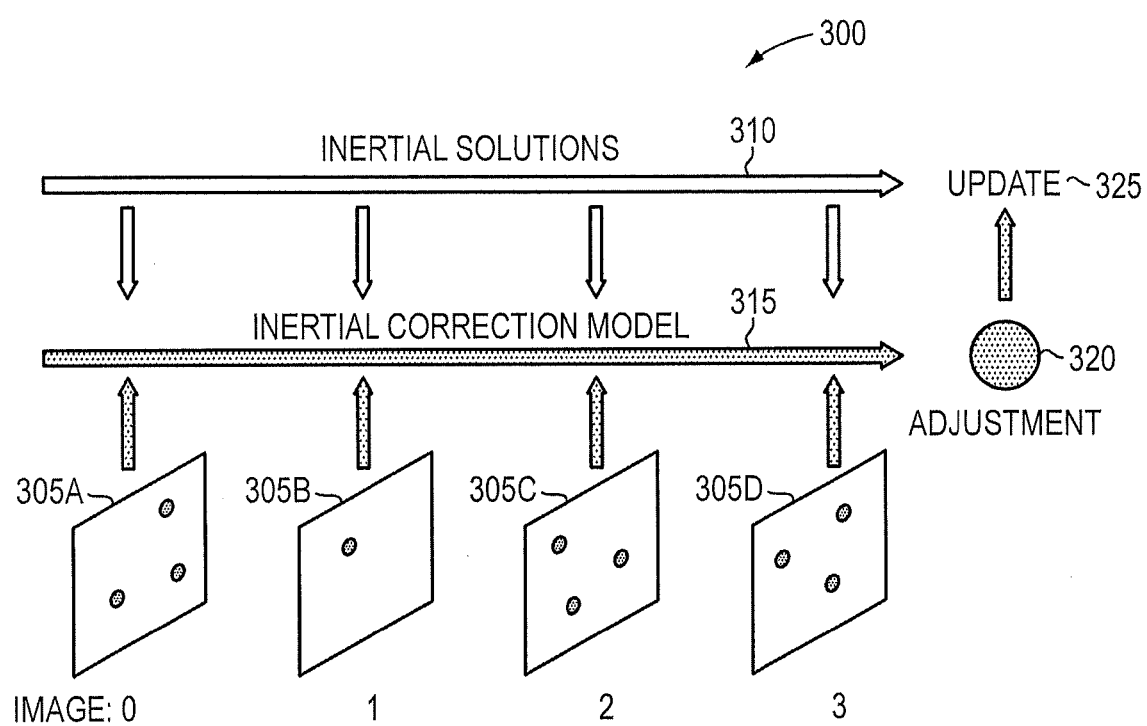
FIG. 3 is a schematic flow diagram in accordance with an illustrative embodiment of the present invention.

FIG. 3 is an exemplary information flow diagram 300 detailing how image observations are fed to an inertial correction model in accordance with an illustrative embodiment of the present invention. Inertial solutions 310, which illustratively comprise inertial location information generated by the INS system 220 are fed into the inertial correction model 315, which is illustratively implemented by the error correction module 250. Similarly, vision system information, obtained from a plurality of acquired images 305A-D is also fed into the inertial correction model 315. The error correction model 315 results in inertial location adjustment information 320 being generated that is then used by the INS system 220 to update 325 the inertial location information 310.

Figure 4:
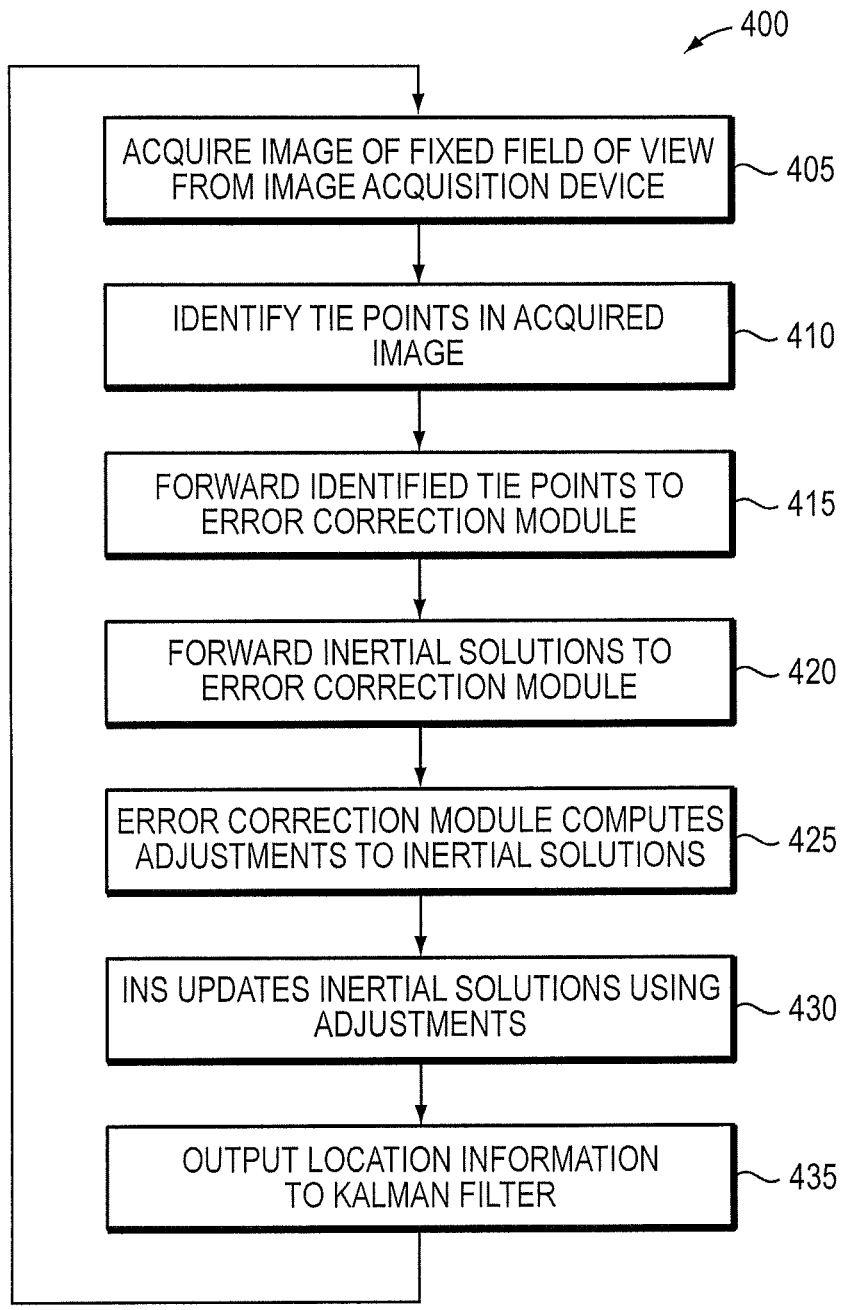
FIG. 4 is a flowchart detailing the steps of a procedure for using partially occluded images for navigation in accordance with an illustrative embodiment of the present invention.

FIG. 4 is a flowchart detailing the steps of the procedure 400 for using a vision system to augment a GNSS/INS system in accordance with an illustrative embodiment of the present invention. Procedure 400 begins in state 405 where an image of the fixed field of view is acquired by an image acquisition device. Illustratively, the image acquisition device comprises a video camera that acquires a plurality of images per second. In accordance with an illustrative embodiment of the present invention, each of the acquired images is time stamped by the clock 240 so that calculations performed thereon are associated with a particular point in time.

The vision system 235 identifies tie points in the acquired image in step 410. These may be identified using conventional image processing techniques as are well known in the art. Tie points may comprise particular features that are viewable in pairs of consecutive images. The vision system 235 then forwards the vision location information (e.g., tie points) to the error correction module 250 in step 415. Similarly, the inertial location information, i.e., the solutions generated by the inertial navigation system, are also fed into the error correction module in step 430. By incorporating the position and orientation information, i.e., the inertial location information, into the error correction module, the system is able to utilize images with less than the normal number of ties points. The error correction module 250 then computes inertial navigation adjustments to the inertial solutions in step 425. These adjustments are computed by using the observed tie points. The inertial navigation adjustments are then used by the INS system 220 to update the inertial location information. The updated inertial location information is utilized as an input to the Kalman filter in step 435. The Kalman filter will combine the GNSS location information, the inertial location information and the vision location information to generate navigation information for the vehicle.

While the present invention is described in relation to a GNSS/INS system, the principles of the present invention may utilize an INS only or GNSS only system. As such, the description of the GNSS/INS system should be taken as exemplary only. It is expressly contemplated that the principles of the present invention may be implemented in hardware, software, including a non-transitory computer readable media, firmware or any combination thereof. As such, the description of actions being performed by a vision processor should be taken as exemplary only.

What is claimed is:

1. A system comprising:
   a GNSS system configured to provide GNSS location information related to a vehicle;
   an inertial navigation system operatively interconnected with the GNSS system, the inertial navigation system configured to provide inertial location information related to the vehicle;
   an image capture device configured to obtain one or more images of a fixed field of view;
   a vision system configured to determine vision system location information using the obtained one or more images, the vision system further configured to forward the vision system location information to an error correction module, the error correction module configured to utilize the inertial location information and the vision system location information to generate inertial navigation system adjustment information, wherein the error correction module utilizes a linear error correction model that utilizes at least a total of 12 tie points within a sequence of one or more of the obtained one or more images; and
   a Kalman filter configured to determine a location of the vehicle using the GNSS location information, the inertial location information and the vision system location information.

2. The system of claim 1 wherein the error correction module is further configured to forward the inertial navigation system adjustment information to the inertial navigation system.

3. The system of claim 2 wherein the inertial navigation system is further configured to update the inertial location information using the inertial navigation system adjustment information.

4. A method comprising:
   using a GNSS system to determine a set of GNSS location information;
   using an inertial system to determine a set of inertial location information;
   obtaining one or more images using an image acquisition device having a fixed field of view;
   using a vision system to obtain a set of vision system location information using the obtained one or more images;

computing, by an error correction module, inertial navigation system adjustment information using the vision system location information, wherein the error correction module utilizes a linear error correction model that utilizes at least a total of 12 tie points within a sequence of one or more of the obtained one or more images; and using a Kalman filter to determine a location of the vehicle using the GNSS location information, the inertial location information and the vision system location information.

5. The method of claim 4 further comprising using the inertial navigation system adjustment to update the inertial system.

6. The method of claim 4 further comprising updating inertial location information.

* * * * *